United States Patent Office 3,189,398
Patented June 15, 1965

3,189,398
ANTHRAQUINONE DYE
Roy A. Pizzarello, Mount Vernon, N.Y., and Walter A. Caraccioli, Clifton, and Otto Poltersdorf, Fair Lawn, N.J., assignors to Interchemical Corporation, New York, N.Y., a corporation of Ohio
No Drawing. Filed Apr. 15, 1963, Ser. No. 272,843
3 Claims. (Cl. 8—39)

The present invention relates to an anthraquinone dye that dyes cellulose acetate, "Dacron," and other synthetic fibers a bright red shade.

The new dye may be represented by the following structural formula,

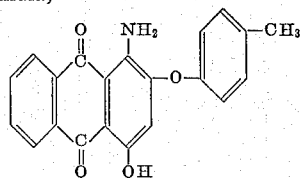

The dye is conveniently prepared by condensing 1-amino-2-halo-4-hydroxy anthraquinone with an alkali metal salt of p-cresol.

Cellulose acetate dyes are known which are derived from 1-amino-2-halo-4-hydroxy anthraquinone or 1,4-diamino-2-halo-anthraquinone by replacing the halogen atom with various groups. Generally speaking these dyes have poor gas fading resistance and their affinity for cellulose acetate is not good. The large majority of them, particularly those derived from 1-amino-2-halo-4-hydroxy anthraquinone, tend to sublime, that is to say the dye is transferable to white backgrounds or to other fabrics when heated, as in laundering and ironing. The dye of this invention does not have those disadvantages. Furthermore it has superior alkali resistance. It dyes "Dacron" (polyester fiber made from terephthalic acid and ethylene glycol) with good buildup and displays great tinctorial strength in this application.

In dyeing Dacron with dispersed dyes it is conventional to use a "carrier" to speed up the dyeing. Although many types of materials are known to be effective carriers, one simple, effective, and inexpensive carrier consisting largely of toluene has been used extensively with certain dyes. However, many dispersed dyes cannot be used with such carriers containing toluene because the toluene tends to cause "tarring" of the dye. Tarring is a term used to describe the tendency of the dispersed dye to agglomerate into colored liquid globules. The dispersed dye of the present invention has the important advantage of not tarring when used with carriers containing toluene.

Example

The dye may be made by slowly adding 344 parts of pulverized potassium carbonate over a 2-hour period to 2400 parts of p-cresol at 50–55° C. The temperature is then raised to 80–85° C. and held at that point for an hour. 800 parts of 1-amino-2-bromo-4-hydroxy anthraquinone are added and the batch is heated 5 hours at 150–155° C. At this point the progress of the reaction may be checked by chromatographic analysis of a sample. The mass is drowned in about 30,000 parts of approximately 1 N sodium hydroxide, stirred 6 to 7 hours, and heated one hour at 60° C. It is then filtered and washed with cold water until Brilliant Yellow paper no longer gives an alkaline test in the wash water. The dye may be kept damp and used as a pulp or it may be dried at about 60–65° C. Yield of the crude product is about 98% of theory.

Dyeing procedure for Dacron

A carrier is made up, for example, by emulsifying 5 g. of a mixture of 100 g. biphenyl, 300 g. toluene, and 30 g. "Pluronic 108," in water to make 1 liter. 10% of this mixture in water is then emulsified with Igepon T51 ($C_{17}H_{33}$.CO.N($CH_3$).$CH_2$.$SO_3$Na) or the like, using ½ g. of the emulsifier per liter.

This carrier is then used in the dyebath to the amount of about 2–5%. The quantity of dye used varies with the dyeing desired; 2% on the weight of the fabric, or 1%, ½%, etc.

The procedure is conventional in the art. Dacron is usually dyed 1½ hours at 212° F. or at even higher temperatures, the latter being achieved by adding a salt to the bath to raise the boiling point. For example, 5–10% by weight of sodium nitrate might be added.

Instead of "Pluronic 108" (a nonionic surfactant based on ethylene oxide and propylene oxide), other nonionic surfactants may be used, such as Alkanol HC
Anhydrapent
Anhydrol 6990 (or 6999)
Caprocyl Leveling Salt
Cerfak 1300 (nonionic alkyl polyoxyethylene thioether)
Cerfak 1305 (nonionic alkyl mercapto polyoxyethylene ethanol)
Cerfak 1400 (nonionic alkyl polyoxyethylene ether)
Cerfak 1405 (nonionic, polyethylene glycol ether)
Detanol PH (nonionic water-soluble long-chain ester)
G–7596–J (polyoxyethylene sorbitan monolaurate)
Ionil Powder Conc. (polyhydric alcohol ether)
Laurel Leveller (nonionic condensate)
Levelene (organic condensation product of high molecular weight)
Marcanol S (fatty-amine condensate)
Marcanon L (fatty acid ester)
Nylsoft (polyoxyethylene derivative)
Renex 35 (polyoxyethylene ether alcohol complexed with urea)
Tween 20 (polyoxyethylene sorbitan monolaurate)
Wicatex N1 (fatty acid/ethylene oxide condensate)

The ratio of dispersing agent to dye is conventional in the art. For this particular dye, the preferred ratio is from about 5–6 parts of dispersant to 1 part of dye. Other adjuvants known to the art may be added if desired.

What is claimed is:
1. Dyed polyester fiber made from terephthalic acid and ethylene glycol, the dye consisting essentially of a compound having the structural formula,

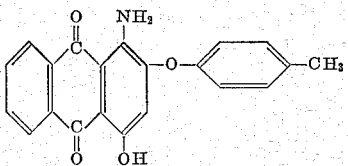

2. A dye composition for dyeing polyester fiber, said fiber having been made from terephthalic acid and ethylene glycol, comprised of dispersing agent and a dye, said dye consisting essentially of a compound having the structural formula,

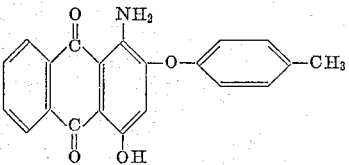

the ratio of dispersing agent to dye being approximately from about 5/1 to 6/1 by weight.

3. The method of dyeing a fiber made from terephthalic acid and ethylene glycol comprising
 (a) immersing the fiber in a dyebath consisting essentially of a major amount of water and a minor amount of the composition described in claim 2,
 (b) maintaining the temperature of the dyebath at about its boiling point for about 1½ hours,
 (c) removing the fiber from the dyebath,
 (d) rinsing the fiber, and
 (e) allowing the fiber to dry.

References Cited by the Examiner

UNITED STATES PATENTS

| | | | |
|---|---|---|---|
| 2,101,910 | 12/37 | Lodge et al. | 260—380 |
| 2,773,071 | 12/56 | Pizzarello et al. | 260—380 |
| 2,888,467 | 5/59 | Richter | 8—39 X |
| 2,916,343 | 12/59 | Hees | 8—55 X |
| 2,934,397 | 4/60 | Landerl | 8—55 |
| 2,937,190 | 5/60 | Straley et al. | 8—55 X |
| 3,124,601 | 3/64 | Genta | 8—39 X |

FOREIGN PATENTS 900,127   7/62   Great Britain.

NORMAN G. TORCHIN, *Primary Examiner.*